United States Patent
Zhang

(10) Patent No.: US 10,642,220 B2
(45) Date of Patent: May 5, 2020

(54) HOLOGRAPHIC DISPLAY DEVICE

(71) Applicant: BOE TECHNOLOGY GROUP CO., LTD., Beijing (CN)

(72) Inventor: Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 170 days.

(21) Appl. No.: 15/760,600

(22) PCT Filed: Aug. 29, 2017

(86) PCT No.: PCT/CN2017/099399
§ 371 (c)(1),
(2) Date: Mar. 15, 2018

(87) PCT Pub. No.: WO2018/126717
PCT Pub. Date: Jul. 12, 2018

(65) Prior Publication Data
US 2019/0041795 A1    Feb. 7, 2019

(30) Foreign Application Priority Data

Jan. 4, 2017   (CN) .................... 2017 2 0006401 U

(51) Int. Cl.
*G03H 1/00* (2006.01)
*G03H 1/22* (2006.01)
(Continued)

(52) U.S. Cl.
CPC .......... *G03H 1/0005* (2013.01); *G02B 27/04* (2013.01); *G02B 27/06* (2013.01); *G02B 30/56* (2020.01);
(Continued)

(58) Field of Classification Search
None
See application file for complete search history.

(56) References Cited

U.S. PATENT DOCUMENTS

2017/0371299 A1* 12/2017 Murphy ............... G03H 1/2202

FOREIGN PATENT DOCUMENTS

CN    203385995 U    1/2014
CN    205809523 U    12/2016
(Continued)

OTHER PUBLICATIONS

International Search Report received for PCT Patent Application No. PCT/CN2017/099399, dated Dec. 1, 2017, 7 pages (2 pages of English Translation and 5 pages of Original Document).

*Primary Examiner* — Jennifer D. Carruth
(74) *Attorney, Agent, or Firm* — Womble Bond Dickinson (US) LLP

(57) ABSTRACT

The present disclosure provides a holographic display device including: a first substrate and a second substrate disposed opposite to each other, wherein a display screen disposed on the first substrate, and the display surface of the display screen faces the second substrate; and four trapezoidal holographic plates, wherein the upper side edge of each trapezoidal holographic plate is movably connected to the first substrate, the lower side edge of each trapezoidal holographic plate is movably connected to the second substrate; wherein the holographic display device has a first state and a second state, wherein in the first state, four trapezoidal holographic plates enclose a four-sided prismoid structure and are supported between the first substrate and the second substrate; in the second state, the first substrate and the second substrate are stacked, and four trapezoidal holographic plates are unfolded to be in the same plane and stacked between the first substrate and the second substrate. The holographic display device provided by the present disclosure can realize miniaturization and improve portability.

18 Claims, 2 Drawing Sheets

(51) Int. Cl.
*G03H 1/02* (2006.01)
*G02B 27/04* (2006.01)
*G02B 27/06* (2006.01)
*G02B 30/56* (2020.01)

(52) U.S. Cl.
CPC ......... *G03H 1/0236* (2013.01); *G03H 1/2202* (2013.01); *G03H 2001/0088* (2013.01); *G03H 2227/02* (2013.01); *G03H 2270/20* (2013.01)

(56) References Cited

FOREIGN PATENT DOCUMENTS

| | | |
|---|---|---|
| CN | 106353996 A | 1/2017 |
| CN | 106842883 A | 6/2017 |
| CN | 206339836 U | 7/2017 |
| JP | 2008-070478 A | 3/2008 |

* cited by examiner

HOLOGRAPHIC DISPLAY DEVICE

RELATED APPLICATION

This application claims the benefit of priority to Chinese Patent Application No. 201720006401.7, filed on Jan. 4, 2017, the entire content of which is incorporated herein by reference.

FIELD OF THE DISCLOSURE

The present disclosure relates to the technical field of display, and in particular, to a holographic display device.

BACKGROUND OF THE DISCLOSURE 360 degree holographic imaging, also known as 3D holographic imaging, is based on the principle that a truncated (or a frustum of) four-sided pyramid or four-sided prismoid (i.e., truncated quadrangular pyramid) is made of a transparent material, images on a display screen can be reflected through a transparent material surface, and thus a viewer can watch free floating images in the tapered space of the four-sided pyramid or the four-sided prismoid from either side, and the viewer can watch 3D phantom display effect by only naked eyes without wearing any viewing device, resulting in excellent visual impact, with a strong sense of depth.

However, the related art holographic display device usually includes a quadrangular pyramid or a four-sided prismoid enclosed by four pieces of holographic film, and a display screen is supported by fixed support rods. Although this structure can obtain holographic stereoscopic images, it is very inconvenient to carry. Therefore, it is currently only used in exhibitions.

SUMMARY OF THE DISCLOSURE

An object of the present disclosure is to provide a holographic display device that can realize miniaturization and improve portability.

The technical solutions provided in the present disclosure are as follows.

A holographic display device includes:

a first substrate and a second substrate disposed opposite to each other, wherein a display screen is disposed on the first substrate, and the display surface of the display screen faces the second substrate; and four trapezoidal holographic plates, the upper side edge of each trapezoidal holographic plate is movably connected to the first substrate, the lower side edge of each trapezoidal holographic plate is movably connected to the second substrate;

wherein the holographic display device has a first state and a second state, in the first state, four trapezoidal holographic plates enclose a four-sided prismoid structure and are supported between the first substrate and the second substrate;

in the second state, the first substrate and the second substrate are stacked, and four trapezoidal holographic plates are unfolded to be in the same plane and stacked between the first substrate and the second substrate.

According to an aspect of the present disclosure, an upper side edge of the trapezoidal holographic plate is connected to the first substrate and is capable of pivoting around the connection; a lower side edge of the trapezoidal holographic plate is connected to the second substrate and can slide on the second substrate;

in the process of forming the first state, the upper side edges of the four trapezoidal holographic plates pivots in the first rotation direction around their connections with the first substrate, and the lower side edges slide on the second substrate to a first position in the direction closer to the middle portion of the second substrate so that the four trapezoidal holographic plates enclose a four-sided prismoid structure;

in the process of forming the second state, the upper side edges of the four trapezoidal holographic plates are pivoted in a second rotation direction about their connections with the first substrate, and the lower side edges slide on the second substrate to a second position in a direction towards the vicinity of the periphery of the second substrate, so that the four trapezoidal holographic plates are unfolded to be in the same plane, and are stacked on the second substrate.

According to an aspect of the present disclosure, four trapezoidal holographic plates are connected to a fixing member at the upper side edges thereof, the fixing member is fixed at a predetermined region of the middle portion of the first substrate; the display screen is disposed around the periphery of the predetermined region and is disposed corresponding to the four trapezoidal holographic plates.

According to an aspect of the present disclosure, the display screen comprises four display sub-screens arranged around the periphery of the predetermined region, the four display sub-screens are provided in correspondence with the four trapezoidal holographic plates one by one, in the first state the orthographic projections of each of the four display sub-screens and its corresponding trapezoidal holographic plate on the second substrate are at least partially overlapped; or, the display screen is a monolithic annular display screen disposed around the periphery of the predetermined region, and the orthographic projections of the display screen and the four trapezoidal holographic plates on the second substrate are at least partially overlapped in the first state.

According to an aspect of the present disclosure, a notch is defined in the predetermined region of the middle of the first substrate, and a light source is disposed in the notch.

According to an aspect of the present disclosure, the fixing member includes:

a fixing ring fixed on the first substrate, the notch being located inside the fixing ring; and, pivoting members connected to the trapezoidal holographic plate, the pivoting member being connected to the fixing ring and capable of pivoting on the fixing ring to drive the trapezoidal holographic plate to pivot.

According to an aspect of the present disclosure, at least one sliding member is disposed on a lower side edge of each of the trapezoidal holographic plates; sliding slots extending from the middle portion of the second substrate toward edges of the second substrate are disposed in the second substrate; the sliding slots are provided in correspondence with the sliding members one by one, and the sliding member is disposed in the respective sliding slot and can slide in the sliding slot.

According to an aspect of the present disclosure, at least one sliding member is respectively disposed at two end points of a lower side edge of each of the trapezoidal holographic plates; and at least eight sliding slots are disposed on the second substrate.

According to an aspect of the present disclosure, limiting mechanisms for limiting the lower side edges of the trapezoidal holographic plates in the first state are further disposed on the second substrate.

According to an aspect of the present disclosure, the limiting mechanism at least comprises: a mounting slot defined in the inner wall of the sliding slot; and an elastic limiting part installed in the mounting slot; wherein the elastic limiting part can retract into the mounting slot when subjected to an external force, and can protrude out of the mounting slot when the external force is removed.

According to an aspect of the present disclosure, the trapezoidal holographic plate comprises: a holographic film including a first surface and a second surface opposite to the first surface; transparent reinforcing plates disposed on the first surface and the second surface of the holographic film respectively.

The beneficial effects of the present disclosure are as follows: the holographic display device provided by the present disclosure can pull apart the first substrate and the second substrate when it needs to display. The four trapezoidal holographic plates enclose a four-sided prismoid structure, and the holographic display device is in an unfolded state (i.e., a first state) to achieve holographic display. When it does not need to display, the first substrate and the second substrate can be stacked on each other, and the four trapezoidal holographic plates are stacked on the second substrate, and the holographic display device is in a folded state (i.e., the second state), to realize miniaturization and portability.

It can be seen from this that the holographic display device provided by the present disclosure can easily achieve the unfolding and the folding of the holographic display device, realize the miniaturization and portability, and can be applied to various displays such as mobile phones and pads.

DETAILED DESCRIPTION OF THE DISCLOSURE

Figure 1:
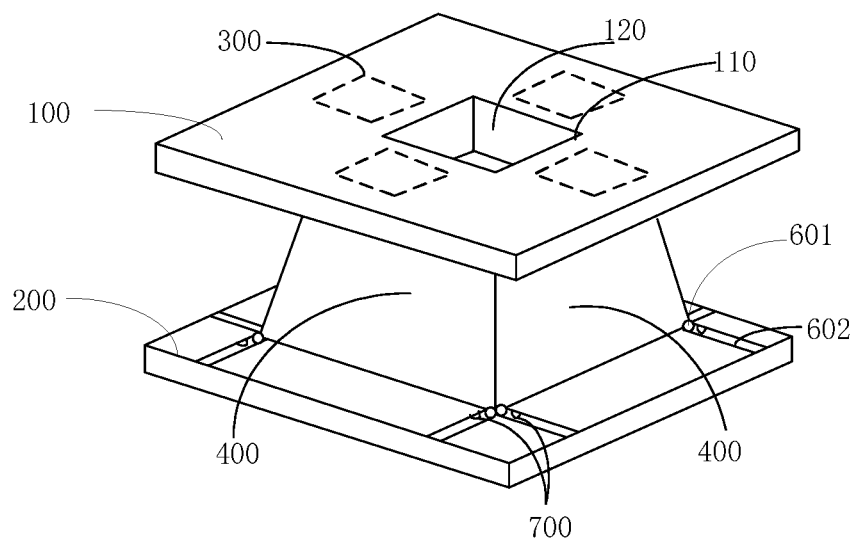
FIG. 1 shows a schematic structural view of a holographic display device provided in an embodiment of the present disclosure in an unfolded state.

To make the objectives, technical solutions, and advantages of the embodiments of the present disclosure more comprehensible, the technical solutions of the embodiments of the present disclosure are clearly and completely described in the following with reference to the accompanying drawings of the embodiments of the present disclosure. Obviously, the described embodiments are only a part but not all of the embodiments of the present disclosure. All other embodiments obtained by those of ordinary skill in the art based on the described embodiments of the present disclosure shall fall within the protection scope of the present disclosure.

In view of the technical problem that the holographic display device is inconveniently carried in the related art, the present disclosure provides a holographic display device, which can realize miniaturization and portability.

As shown in FIG. 1 to FIG. 4, the holographic display device provided in the present disclosure includes:

a first substrate 100 and a second substrate 200 opposite to each other, wherein a display screen 300 is disposed on the first substrate 100, and a display surface of the display screen 300 faces the second substrate 200, and four trapezoidal holographic plates 400, wherein the upper side edge of each trapezoidal holographic plate 400 is movably connected to the first substrate 100 and the lower side edge thereof is movably connected to the second substrate 200;

wherein the holographic display device has a first state and a second state,

In the first state, four trapezoidal holographic plates 400 can enclose a four-sided prismoid structure and be supported between the first substrate 100 and the second substrate 200; in the second state, the first substrate 100 and the second substrate 200 can be stacked on each other, and the four trapezoidal holographic plates 400 can be unfolded to be in the same plane (i.e., substantially in the same layer) and stacked on the first substrate 100 and the second substrate 200.

Figure 3:
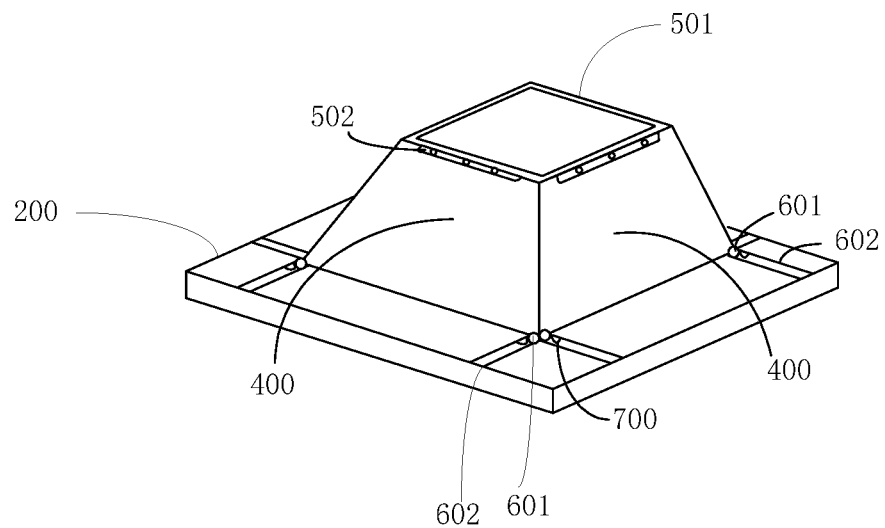
FIG. 3 shows a partial schematic structural view of a holographic display device provided in an embodiment of the present disclosure in an unfolded state.

In the holographic display device provided by the present disclosure, as shown in FIGS. 1 and 3, the first substrate 100 and the second substrate 200 can be pulled apart when it needs to display so that the four trapezoidal holographic plates 400 enclose a four-sided prismoid structure, and are supported between the first substrate 100 and the second substrate 200. The holographic display device is in an unfolded state (i.e., a first state), and the display screen 300 on the first substrate 100 projects the image onto four trapezoidal holographic plates 400, therefore the image floating in the middle portion of the four-sided prismoid can be viewed from any angle, achieving holographic display.

Figure 2:
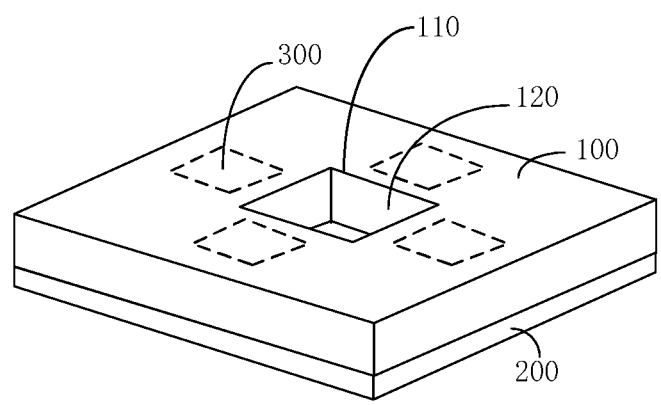
FIG. 2 shows a schematic structural view of a holographic display device provided in an embodiment of the present disclosure in a folded state.
Figure 4:
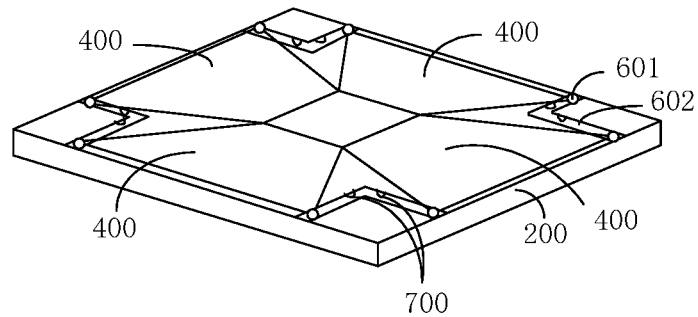
FIG. 4 is a partial schematic structural view of a holographic display device according to an embodiment of the present disclosure in a folded state.

As shown in FIGS. 2 and 4, when it does not need to display, the first substrate 100 and the second substrate 200 may be stacked on each other so that the four trapezoidal holographic plates 400 are unfolded to be in the same plane and stacked between the first substrate 100 and the second substrate 200. The holographic display device is in a folded state (i.e., the second state) so as to realize miniaturization and portability.

It can be seen from this that the holographic display device provided by the present disclosure can easily achieve the unfolding and the folding of the holographic display device, realizing miniaturization and portability, and can be applied to various displays such as mobile phones and pads.

It should be noted that the display screen 300 may be an OLED, an LCD, or other displays. Each trapezoidal holographic plate 400 may include a holographic film including a first surface and a second surface opposite to the first surface; and transparent reinforcing plates respectively disposed on the first surface and the second surface of the holographic film, wherein the transparent reinforcing plate may be plastic or other transparent material plate.

The following describes an exemplary embodiment of the holographic display device provided by the present disclosure.

In an exemplary embodiment provided by the present disclosure, as shown in FIG. 1 to FIG. 4, an upper side edge of the trapezoidal holographic plate 400 is connected to the first substrate 100 and can pivot about the connection; the lower side edge of the trapezoidal holographic plate 400 is connected to the second substrate 200 and can slide on the second substrate 200.

In the process of forming the first state (i.e., the unfolding process), the upper side edges of the four trapezoidal holographic plates 400 are pivoted in the first rotation direction about their connections with the first substrate 100, and the lower side edges slide on the second substrate to a first position in a direction closer to the middle portion of the second substrate 200 so that the four trapezoidal holographic plates 400 enclose a four-sided prismoid structure.

In the process of forming the second state (i.e., the folding process), the upper side edges of the four trapezoidal holographic plates 400 pivot in the second rotation direction about their connections with the first substrate 100. The lower side edges slide on the second substrate to a second position in a direction towards the vicinity of the periphery of the second substrate 200 so that the four trapezoidal holographic plates 400 are unfolded to be in the same plane and stacked on the second substrate 200.

In the above solution, the upper side edges of the four trapezoidal holographic plates 400 are pivotally connected to the first substrate 100 while the lower side edges are slidably connected to the second substrate 200. When it is necessary to unfold the holographic display device, the first substrate 100 is pulled upward to make the upper side edges of the four trapezoidal holographic plates 400 pivot in the first rotation direction about their connections with the first substrate 100. The lower side edges slide in a direction towards the middle portion of the second substrate 200 so that the four trapezoidal holographic plates 400 are supported in a form of a four-sided prismoid structure between the first substrate 100 and the second substrate 200.

When it is necessary to fold, the first substrate 100 is pressed downwards, the upper side edges of the four trapezoidal holographic plates 400 can pivot in a second direction opposite to the first direction about their connections with the first substrate 100. The lower side edges slide in a direction towards the vicinity of the periphery of the second substrate 200 so that the four trapezoidal holographic plates 400 are unfolded to be in the same plane and stacked between the first substrate 100 and the second substrate 200.

According to the above solution, the connecting structure between the four trapezoidal holographic plates 400 and the first substrate 100 as well as the second substrate 200 is simple, and the unfolding and folding operations are convenient.

It should be understood that, in practical applications, the connecting structure between the four trapezoidal holographic plates 400 and the first substrate 100 as well as the second substrate 200 may also adopt other ways, which are not limited thereto.

In addition, in the embodiment provided by the present disclosure, exemplarily, as shown in FIG. 1 to FIG. 4, the upper side edges of the four trapezoidal holographic plates 400 are connected to a fixing member fixed on the predetermined region in the middle portion of the first substrate 100; and the display screen 300 is disposed around the periphery of the predetermined region and corresponding to the four trapezoidal holographic plates 400.

If the middle portion of the first substrate 100 is the display screen 300, the four trapezoidal holographic plates 400 cannot be directly fixed on the display screen 300. Instead, the fixing member is fixed at a predetermined region in the middle of the first substrate 100 (the predetermined region can be an area at the center position of the first substrate 100, or an area at the other position in the middle of the first substrate 100), then the display screen 300 is disposed around the fixing member. Then the four trapezoidal holographic plates 400 are fixed on the first substrate 100 through the fixing member so as to enable the image of the display screen 300 to be projected onto the four trapezoidal holographic plates 400 to achieve holographic display. In this way, the problem of the fixed connection of the trapezoidal holographic plate 400 can also be solved.

It should be noted that, in practical applications, the connection between the four trapezoidal holographic plates 400 and the first substrate 100 is not limited thereto, and other methods may also be adopted according to actual needs, which are not listed here.

In addition, in the embodiment provided by the present disclosure, as an example, as shown in FIG. 1 to FIG. 4, the display screen 300 includes four display sub-screens arranged around the periphery of the predetermined region. Four display sub-screens are provided in correspondence with the four trapezoidal holographic plates 400. The orthographic projections of each display sub-screen and its corresponding trapezoidal holographic plate 400 on the second substrate are at least partially overlapped in the first state.

According to the above solution, the display screen 300 may include four display sub-screens embedded in the first substrate 100. In the first state, the images on the four display sub-screens may be projected onto the corresponding trapezoidal holographic plates 400, in order to achieve holographic display.

It should be noted that in practical applications, the display screen 300 may further be a monolithic annular display screen 300 embedded in the first substrate 100 and disposed around the periphery of the predetermined region. The orthographic projections of the display 300 and the four trapezoidal holographic plates 400 on the second substrate 200 in the first state are at least partially overlapped, so that in the first state, the image of the display screen 300 can be projected onto the four trapezoidal holographic plates 400.

In addition, in the exemplary embodiment provided by the present disclosure, a notch 110 is formed in a predetermined region of the middle of the first substrate 100, and a light source 120 is disposed in the notch 110.

In this case, the first substrate 100 may include an outer frame and an inner frame, wherein the area enclosed by the inner frame forms the notch 110, and a light source 120 (e.g., an LED Lamp) is disposed in the notch 110 which can increase the display brightness of the holographic display device.

In addition, in the embodiment provided by the present disclosure, as an example, as shown in FIG. 3 and FIG. 4, the fixing member includes: a fixing ring 501, which is fixed on the first substrate, and the notch is located inside the fixing ring such that the fixing ring 501 is fixed around the periphery of the notch 110; and, pivoting members 502 for connecting with the trapezoidal holographic plates 400. The pivoting member 502 is pivotally connected to the fixing ring 501, and is capable of pivoting on the fixing ring 501 to drive the trapezoidal holographic plate 400 to pivot.

According to the above solution, the fixing member adopts a manner that the fixing ring 501 and the pivoting member 502 cooperate with each other, and the pivoting member 502 may adopt a hinge structure, which may include a first fixing plate and a second fixing plate movably connected, and the first fixing plate and the second fixing plate can be folded and unfolded around the connection of the two. The upper side edge of the trapezoidal holographic plate 400 can be fixed on the first fixing plate of the pivoting member 502 by screws, and the second fixing plate is fixed on the fixing ring 501. The fixing ring 501 in turn is fixed on the inner frame of the first substrate 100. In this way, the movable linkage between the trapezoidal holographic plate 400 and the first substrate 100 can be realized, and this structure is simple, easy to operate.

It should be understood that, in other embodiments of the present disclosure, the fixing members may also adopt other structures, which are not listed here one by one.

In addition, in the embodiment provided by the present disclosure, as an example, as shown in FIG. 1 to FIG. 4, at least one sliding member 601 is disposed on a lower side edge of each trapezoidal holographic plate 400; sliding slots 602 are provided in the second substrate 200 which extend from the middle of the second substrate 200 to the edge of the second substrate 200. The sliding slots 602 is corresponding to the sliding members 601 one by one. The sliding member 601 is disposed in the respective sliding slot 602 and can slide in the sliding slot 602.

According to the above solution, the sliding member 601 and the sliding slot 602 are matched with each other to achieve the sliding connection between the trapezoidal holographic plate 400 and the second substrate 200, and the structure is simple. It should be understood that in practical applications, the trapezoidal holographic plate 400 may also be slidably disposed on the second substrate 200 by other structures, which is not limited thereto.

In addition, in the embodiment provided by the present disclosure, as an example, as shown in FIG. 1 to FIG. 4, at least one sliding member 601 is provided at two endpoints of the lower side edge of each trapezoidal holographic plate 400; and at least eight sliding slots 602 are disposed on the second substrate 200.

In the above exemplary solution, at least one sliding member 601 is respectively disposed at two bottom corners of a lower side edge of the trapezoidal holographic plate 400, so as to ensure smooth and stable sliding process of the trapezoidal holographic plate 400.

It should be noted that, the sliding member 601 may be a pulley structure, a ball or the like, which is not limited thereto.

It should also be noted that, in practical applications, the positions and the specific numbers of the sliding members 601 and the sliding slots 602 are not limited, and may be adjusted according to actual needs.

In addition, in the embodiment provided by the present disclosure, as an example, as shown in FIGS. 1, 3, and 4, limiting mechanisms 700 are provided on the second substrate 200 for limiting the lower side edges of the trapezoidal holographic plates 400 in the first state.

According to the above solution, the limiting mechanisms 700 disposed on the second substrate 200 limit the positions of the sliding members 601 so that in the first state, the four trapezoidal holographic plates 400 slide to the second position, enclosing a four-sided prismoid structure, and fixed in the second position.

Exemplarily, the limiting mechanism 700 includes at least: a mounting slot disposed on an inner wall of the sliding slot 602; and an elastic limiting part installed in the mounting slot; wherein the elastic limiting member is capable of retracting into the mounting slot when subjected to external force, and protrudes out of the mounting slot when external force is removed.

According to the above solution, the limiting mechanism 700 adopts an elastic limit mechanism and pulls the first substrate 100 when it is necessary to display. The lower side edges of the four trapezoidal holographic plates 400 slide from the periphery of the second substrate 200 to the middle. When the sliding member 601 passes through the elastic limiting part, a force is applied to the elastic limiting part such that the elastic limiting part first retracts and then rebounds to define the lower side edge of the trapezoidal holographic plate 400 at the second position, and after it is used, the first substrate 100 is slightly pressed, the four trapezoidal holographic plates 400 are applied force through the fixed ring 501, so that the sliding member 601 at the lower side edge of the trapezoidal holographic plate 400 apply force to the elastic limit part. The elastic limiting part retracts so that the sliding member 601 passes the elastic limiting part and slides from the middle of the second substrate 200 to the periphery to fold the holographic display device.

It can be seen from the above that the limiting mechanism 700 in the above solution adopts the elastic limiting mechanism without the need of operating the elastic limiting mechanism separately, and the utility model has the advantages of convenient operation and simple structure.

It should be understood that in practical applications, the specific structure of the limiting mechanism 700 may not be limited thereto. Other structures may also be adopted. For example, the limiting mechanism 700 may also be a buckle or the like.

It should also be noted that, in the above solution, the elastic limiting part may use elastic positioning beads or the like.

The working process of the holographic display device provided by the exemplary embodiments of the present disclosure will be described in detail with reference to FIG. 1 to FIG. 4.

When the holographic display device needs to display, the first substrate 100 and the second substrate 200 are gently pulled. The first substrate 100 drives the fixing ring 501 to move upwards. The sliding members 601 disposed at the bottom corners of the four trapezoidal holographic plates 400 can move to the middle along the sliding slots 602. When the trapezoidal holographic plate 400 and the second substrate 200 are at an appropriate angle (e.g., 45 degrees), the sliding member 601 is fixed by the elastic limiting mechanism, and the then four trapezoidal holographic plates 400 are spliced into a four-sided prismoid structure, and each display screen 300 projects an image onto the corresponding trapezoidal holographic plate 400 to achieve holographic display. The display brightness of the holographic display device can be increased by adjusting brightness of the LED on the inner frame of the first substrate 100.

When the use is finished, the first substrate 100 is slightly pressed. The first substrate 100 applies force to the four trapezoidal holographic plates 400 through the fixing ring 501, so that the sliding member 601 returns to the edge of the second substrate 200 via the elastic limit mechanism (as shown in FIG. 4) to fold the holographic display device.

The above descriptions are merely exemplary embodiments of the present disclosure. It should be noted that those skilled in the art may make various improvements and replacements without departing from the technical principles of the present disclosure. These improvements and replacement should also be considered as a protection of the present disclosure.

The invention claimed is:

1. A holographic display device comprising:
    a first substrate and a second substrate disposed opposite to each other, wherein a display screen is disposed on the first substrate, and a display surface of the display screen faces the second substrate; and
    four trapezoidal holographic plates, wherein an upper side edge of each trapezoidal holographic plate is movably connected to the first substrate, a lower side edge of each trapezoidal holographic plate is movably connected to the second substrate;
wherein the holographic display device has a first state and a second state,
in the first state, the four trapezoidal holographic plates enclose a four-sided prismoid structure and are supported between the first substrate and the second substrate;
in the second state, the first substrate and the second substrate are stacked, and the four trapezoidal holographic plates are unfolded to be in a same plane and stacked between the first substrate and the second substrate, and
wherein:
the upper side edge of each trapezoidal holographic plate is connected to the first substrate and is capable of pivoting around a connection;
a lower side edge of the trapezoidal holographic plate is connected to the second substrate and can slide on the second substrate;
in a process of forming the first state, the upper side edges of the four trapezoidal holographic plates pivot in a first rotation direction around their connections with the first substrate, and the lower side edges slide to a first position in a direction towards a middle portion of the second substrate so that the four trapezoidal holographic plates enclose the four-sided prismoid structure;
in a process of forming the second state, the upper side edges of the four trapezoidal holographic plates are pivoted in a second rotation direction about their connections with the first substrate, and the lower side edges slide to a second position in a direction towards a vicinity of periphery of the second substrate, so that the four trapezoidal holographic plates are unfolded to be in the same plane, and are stacked on the second substrate.

2. The holographic display device according to claim 1, wherein the upper side edges of the four trapezoidal holographic plates are connected to a fixing member, the fixing member is fixed at a predetermined region of a middle portion of the first substrate; the display screen is disposed around a periphery of the predetermined region and is disposed corresponding to the four trapezoidal holographic plates.

3. The holographic display device according to claim 2, wherein,
the display screen comprises four display sub-screens arranged around the periphery of the predetermined region, the four display sub-screens are provided in correspondence with the four trapezoidal holographic plates one by one, orthographic projections of each display sub-screen and its corresponding trapezoidal holographic plate on the second substrate in the first state are at least partially overlapped; or
the display screen is a monolithic annular display screen disposed around the periphery of the predetermined region, and the orthographic projections of the annular display screen and the four trapezoidal holographic plates on the second substrate in the first state are at least partially overlapped.

4. The holographic display device according to claim 3, wherein the trapezoidal holographic plate comprises: a holographic film comprising a first surface and a second surface opposite to the first surface; transparent reinforcing plates disposed on the first surface and the second surface of the holographic film respectively.

5. The holographic display device according to claim 2, wherein,
a notch is provided in the predetermined region of the middle portion of the first substrate, and a light source is disposed in the notch.

6. The holographic display device according to claim 5, wherein,
the fixing member comprises:
a fixing ring fixed on the first substrate, the notch being located inside the fixing ring; and,
pivoting members connected to the trapezoidal holographic plates, the pivoting member being connected to the fixing ring and capable of pivoting on the fixing ring to drive the trapezoidal holographic plate to pivot.

7. The holographic display device according to claim 6, wherein the trapezoidal holographic plate comprises: a holographic film comprising a first surface and a second surface opposite to the first surface; transparent reinforcing plates disposed on the first surface and the second surface of the holographic film respectively.

8. The holographic display device according to claim 5, wherein the trapezoidal holographic plate comprises: a holographic film comprising a first surface and a second surface opposite to the first surface; transparent reinforcing plates disposed on the first surface and the second surface of the holographic film respectively.

9. The holographic display device according to claim 2, wherein the trapezoidal holographic plate comprises: a holographic film comprising a first surface and a second surface opposite to the first surface; transparent reinforcing plates disposed on the first surface and the second surface of the holographic film respectively.

10. The holographic display device according to claim 1, wherein,
at least one sliding member is disposed on the lower side edge of each of the trapezoidal holographic plates; sliding slots extending from the middle portion of the second substrate toward the periphery of the second substrate are disposed on the second substrate; the sliding slots are provided in correspondence with the sliding members one by one, and the sliding member is disposed in the respective sliding slot and can slide in the sliding slot.

11. The holographic display device according to claim 10, wherein,
at least one sliding member is respectively disposed at two end points of the lower side edge of each of the trapezoidal holographic plates; and at least eight sliding slots are disposed on the second substrate.

12. The holographic display device according to claim 11, wherein the trapezoidal holographic plate comprises: a holographic film comprising a first surface and a second surface opposite to the first surface; transparent reinforcing plates disposed on the first surface and the second surface of the holographic film respectively.

13. The holographic display device according to claim 10, wherein,
limiting mechanisms for limiting the lower side edges of the trapezoidal holographic plates in the first state are further disposed on the second substrate.

14. The holographic display device according to claim 13, wherein:
the limiting mechanism at least comprises: a mounting slot provided in an inner wall of the sliding slot; and an elastic limiting part installed in the mounting slot; wherein the elastic limiting part can retract into the mounting slot when subjected to an external force, and protrude out of the mounting slot when the external force is removed.

15. The holographic display device according to claim 14, wherein the trapezoidal holographic plate comprises: a holographic film comprising a first surface and a second surface opposite to the first surface; transparent reinforcing plates disposed on the first surface and the second surface of the holographic film respectively.

16. The holographic display device according to claim 13, wherein the trapezoidal holographic plate comprises: a holographic film comprising a first surface and a second surface opposite to the first surface; transparent reinforcing plates disposed on the first surface and the second surface of the holographic film respectively.

17. The holographic display device according to claim 10, wherein the trapezoidal holographic plate comprises: a holographic film comprising a first surface and a second surface opposite to the first surface; transparent reinforcing plates disposed on the first surface and the second surface of the holographic film respectively.

18. The holographic display device according to claim 1, wherein the trapezoidal holographic plate comprises: a holographic film comprising a first surface and a second surface opposite to the first surface; transparent reinforcing plates disposed on the first surface and the second surface of the holographic film respectively.

* * * * *